No. 727,612. PATENTED MAY 12, 1903.
R. C. GLANVILLE.
FINGER MOISTENER.
APPLICATION FILED MAR. 14, 1902.
NO MODEL.
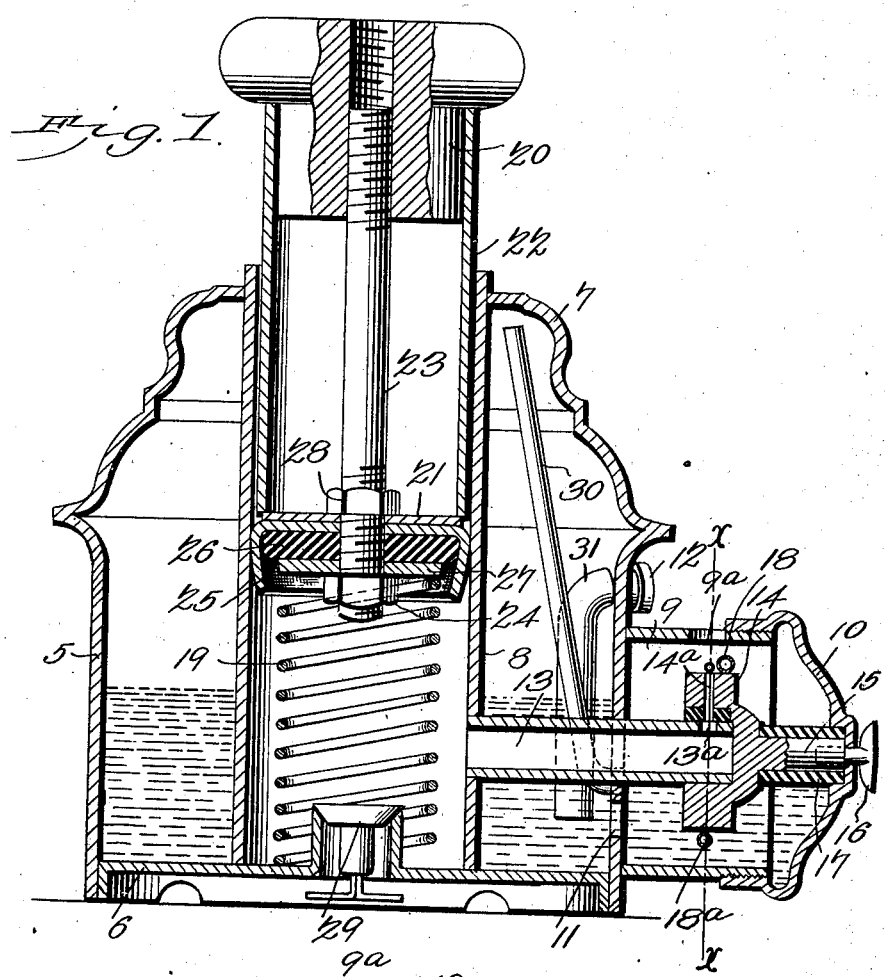
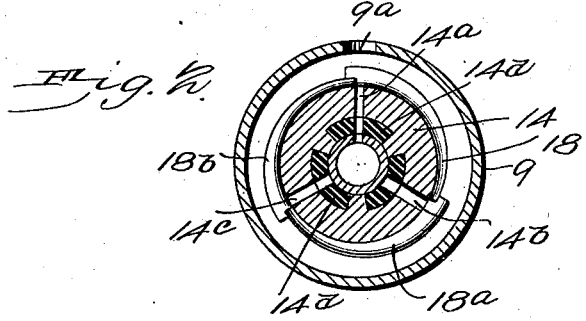

No. 727,612. Patented May 12, 1903.

UNITED STATES PATENT OFFICE.

RICHARD C. GLANVILLE, OF GRAND ISLAND, NEBRASKA.

FINGER-MOISTENER.

SPECIFICATION forming part of Letters Patent No. 727,612, dated May 12, 1903.

Application filed March 14, 1902. Serial No. 98,243. (No model.)

*To all whom it may concern:*

Be it known that I, RICHARD C. GLANVILLE, a citizen of the United States, residing at Grand Island, in the county of Hall and State of Nebraska, have invented a new and useful Finger-Moistener, of which the following is a specification.

This invention relates to devices employed for the purpose of projecting liquid in the form of a fine spray or to devices known as "atomizers," and has for its object more particularly a device which may be employed by cashiers and others who are required to handle money for the purpose of moistening the fingers, but which may also be employed for other purposes, if required.

In the invention is comprised an inclosed casing or reservoir for the liquid, a supplemental chamber disposed to receive liquid from the reservoir, an air-chamber, a variable spraying means, and means whereby the air from the air-chamber may be caused to actuate the spraying means.

In the drawings illustrative of the invention, Figure 1 is a sectional side elevation of the device complete. Fig. 2 is a vertical transverse sectional view taken through the atomizing means of the device on a plane at right angles to Fig. 1.

The casing or shell is formed of side walls 5, a closed bottom 6, and closed top 7 and with an internal (preferably cylindrical) chamber formed by cylindrical vertical wall 8. Formed upon one side of the casing near the bottom is a supplemental chamber 9, preferably with a liquid-tight cap 10 closing its outer end, as shown, so that the interior of the chamber is easily accessible. The chamber 9 communicates with the interior of the main casing by an aperture 11, whereby the liquid from the reservoir freely enters the chamber and is caused to stand at such level in chamber 9 as to submerge the apertures between said chambers. This main casing forms the main reservoir or source of supply for the liquid which is employed in the device. One part of the side wall 5 is provided with an opening through which a tube 31 extends downwardly into the main casing, the outer end of said tube being closed by a screw-cap 12, by removing which the liquid may be supplied to the reservoir.

Leading from the air-chamber formed by the walls 8 is a tube 13 and ending centrally of the chamber 9 near its front, as shown. Surrounding this tube 13 at its outer end is a collar 14, having a central stud or shaft 15 extended to the cap 10 and preferably abutting against its inner side and supplied with a finger-stud 16, connected thereto through the cap, and by which means the stud and collar may be revolved from the outside. Surrounding the stud 15 between the collar 14 and the interior of the cap 10 is a packing-tube, of rubber or other flexible material, 17, which serves the twofold purpose of a packing to prevent leakage between the cap 10 and stud 15 and its operating-pin 16 and also as a means of holding the collar 14 in place upon the tube 13. The tube 13 is provided with an aperture $13^a$ near its outer end, and the chamber 9 is provided with a corresponding aperture $9^a$ in vertical alinement therewith, both apertures opening upward, as shown.

At equal intervals in the collar 14 are formed radial apertures $14^a$, $14^b$, and $14^c$, graduated in size and each adapted to successively register with the alined apertures $13^a$ and $9^a$ as the collar is revolved. By this means any one of the apertures $14^a$, $14^b$, or $14^c$ may be placed in alinement with the apertures $13^a$ and $9^a$ by merely turning the collar by means of the stud 16. The collar 14 is provided with interior cavities, in which segmental packing-blocks $14^d$ are inserted to insure a liquid-tight joint between the collar 14 and the tube 13. While three of the apertures $14^a$, $14^b$, and $14^c$ are shown, I do not wish to be limited to this or any other specific number, as this number may be increased or decreased, as required.

Attached to the exterior of the collar 14 is a series of tapered spray-tubes 18, $18^a$, and $18^b$, equal in number to the apertures $14^a$, $14^b$, and $14^c$, and each with its smaller or outlet end adjacent to one of the apertures $14^a$, $14^b$, and $14^c$, as shown in Fig. 2. The spray-tubes are preferably longer than the distance between each pair of the spray-apertures in the collar 14, so that the larger or inlet end of each spray-tube laps by the smaller or outlet end of the adjacent tube, as shown in Fig. 2, the tubes being attached to the collar at slight inclines to provide for this arrangement. By this means two results are accomplished—longer spray-tubes can be employed and the discharge end of one tube will not be interfered with or affected by the adjacent intake end of the next tube.

Within the air-chamber formed by the wall 8 is a plunger having a rubber, leather, or other suitable packing and supported normally upward by a spring 19, as shown. The plunger consists of a head 20, preferably of wood, a metal disk 21, a tubular section 22 between the head and the disk and a central screw-rod 23, connecting the disk and head through the tubular section, a packing means being supported between the disk and the nut 24 of the rod. The packing consists of an inverted-cup-shaped member 25, preferably of leather, a yieldable backing 26, preferably of rubber, and a holding-washer 27 between the backing and the nut 24, as shown. Another nut 28 engages the rod 23 above the disk 21, so that the backing member 26 may be compressed between the disks 21 and 27 independently of the portion of the rod between the disk 21 and the head 20. The head 20 is screw-threaded upon the rod 23, so that it also serves as a nut, whereby the head 20, disk 21, and tube 22 may be firmly clamped together independently of the means whereby the packing members are adjusted. This makes a very simple, light, and strong plunger of large area, so that it will operate with great ease and regularity and with the minimum amount of friction and corresponding minimum amount of the wearing of the parts. The member 26 being of comparatively soft rubber will readily compress under the pressure to which it is subjected and will naturally be expanded laterally by this compression and distend the leather packing 25, and thereby insure the requisite liquid-tight joint between the packing and the tube 8. A valve 29 will be located in the bottom of the air-chamber, opening upward through the bottom 6 to admit air to the air-chamber, and an air-tube 30 will be connected into the chamber 9 at desired water-line and extended upward and opening into the space in the reservoir above the water, as shown. It will be seen that while this pipe 30 connects the chamber 9 with the air-space in the main reservoir the lower end of said air-pipe is constantly submerged or sealed by the water in the chamber 9, which is thus maintained at the desired level. By this means an undesirable suction is prevented from being formed in the air-chamber below the piston and the pressure in the main reservoir and the supplemental chamber controlled, so that the water-level will be maintained at same point in chamber 9. These are important features of the invention and prevent the flooding of the chamber 9 or too strong an air-pressure being forced inward through the sprayer. When thus constructed and assembled and the liquid supplied up to the point represented by dotted lines in Fig. 1, any compression of the head 20 will cause an air-jet to be driven through the tube 13 and exert its force through whichever one of the spray-jets in the collar 14 is set in alinement with the apertures $13^a$ and $9^a$, and thus draw water through the corresponding tapered spray-tube, the lower end of which will at the time be submerged below the level of the water in the chamber 9, and forcefully eject it through the aperture $9^a$ in the form of a fine spray, the remaining apertures in the collar 14 and the correspondingly remaining tapered spray-tubes remaining inactive, as their respective apertures are for the time being cut off by the imperforate portion of the tube 13. It is obvious that the curved and tapered spray-tubes 18, $18^a$, and $18^b$ must be made of sufficient length so that their lower wide ends shall be submerged below the level of the water in the chamber 9 when arranged in operative position—that is, the lower end of the spray-tube whose upper end is adjacent to the perforation through which air is being expelled must be submerged in order to enable the device to operate as an atomizer. This condition may be readily brought about by properly proportioning the parts of the device and properly locating the tube 30, the lower end of which determines the water-level in the chamber 9. If a coarser or finer spray is required, it can be easily obtained by turning the collar 14 to bring a coarser or finer aperture into action. The action is the same, therefore, as in the ordinary atomizer.

In using the device if the palm of the hand which actuates the head 20 be placed with the fingers extending downward adjacent to the aperture $9^a$ the sprays will be thrown upon the fingers and impart to them the requisite moisture. The device will thus be particularly convenient and efficient for cashiers and others who are required to handle money and similar articles requiring frequent moistening of the fingers, as the moistening can be effected so easily and with a movement of the hand requiring so little exertion. Moreover, the moisture is applied over so large an area of the fingers that it is much more efficient than the devices ordinarily employed for this purpose.

The construction is very simple and the device is easily operated and kept in order.

The construction and proportions may be modified in minor details without affecting the scope or spirit of the invention. It may be made in any size or configuration and of any varied ornamental design which may be desired.

The atmospheric pressure on the water in chamber 9 being greater than in the confined space above the water in the reservoir prevents the water in the chamber 9 rising above the lower end of the pipe 30. Hence the reservoir may be filled with water without danger of its overflowing through the aperture $9^a$.

If preferred, a pipe 31 may be arranged to lead downward from the inlet to the reservoir 5 to a point near the bottom of the reservoir below the constant water-level in the chamber 9, so that the cap 12 may be dispensed with. This may be employed under some circumstances and further simplifies the structure, as when employed it requires no further action to refill the reservoir than to merely tip the device on its side and pour in the water through the tube 31.

Having thus described the invention, what is claimed as new is—

1. In a device of the character described, a liquid-reservoir, a distributing-chamber disposed adjacent to, and connected therewith, an atomizer partly submerged within said chamber, and an air-duct opening in front of said atomizer.

2. In a device of the character described, a liquid-reservoir, a distributing-chamber connected therewith, an air-chamber inclosed within the liquid-reservoir, an atomizer within the distributing-chamber, and a duct for conveying air from the air-chamber to the atomizer, said duct opening in front of the atomizer-tube, substantially as set forth.

3. In a device of the character described, a liquid-reservoir, an air-chamber surrounded thereby, a distributing-chamber connected with said reservoir, an atomizer within the distributing-chamber, an air-duct leading from the air-chamber to the atomizer, and a plunger operating in said air-chamber, substantially as set forth.

4. In a device of the character described, a liquid-reservoir, an air-chamber inclosed thereby, a distributing-chamber connected with the reservoir and receiving liquid therefrom, a removable cover for said distributing-chamber, an atomizer within the latter, an air-duct leading from the air-chamber to the atomizer, and means for forcing air from said chamber through said duct, substantially as set forth.

5. In a device of the character described, a liquid-reservoir, a distributing-chamber connected therewith, an air-chamber having a duct extending into said distributing-chamber and having an opening, a disk mounted revolubly upon said duct, a plurality of atomizers mounted upon said disk, perforations extending through the latter and adapted to be successively brought into registration with the opening of the air-duct, said perforations terminating in alinement with the outer ends of the atomizers, and means for forcing air from the air-chamber through the duct upon which said disk is mounted, substantially as set forth.

6. In a device of the character described, a liquid-reservoir, a distributing-chamber disposed adjacent to and communicating with said reservoir, and having a spray-discharge opening, an atomizer partly submerged within said chamber, and means for supplying an air-blast to said atomizer whereby the liquid shall be discharged in the form of spray through the opening provided for the purpose, substantially as set forth.

7. In a device of the character described, the combination with a liquid-distributing chamber having a discharge-opening, of a disk mounted revolubly within said chamber, a plurality of atomizers mounted upon said disk, air-ducts extending through the latter and terminating in front of the atomizers, and means for forcing air through one of said ducts which terminates in front of the atomizer temporarily in alinement with the discharge-opening, substantially as set forth.

8. In a device of the character described, an inclosed reservoir for the liquid, a supplemental chamber communicating with and receiving liquid from said reservoir and having an orifice therein opening upward adjacent to said reservoir, an air-chamber disposed within said reservoir, an atomizer within said supplemental chamber and communicating with said air-chamber and terminating beneath said orifice, and a plunger operating within said air-chamber and projecting from said reservoir, whereby the fingers of the hand which operates the said plunger may be extended over said orifice and receive the spray from said atomizer, substantially as shown and described.

9. In a device of the character described, an inclosed substantially cylindrical reservoir, a cylindrical air-chamber concentrically disposed within said reservoir, a supplemental chamber communicating with said reservoir and receiving liquid therefrom and having an orifice therein opening upward adjacent to said reservoir, an atomizer within said chamber communicating with said air-chamber and terminating beneath said orifice, and a plunger operating within said air-chamber and extending above said reservoir, substantially as shown and described.

10. In a device of the character described, a liquid-reservoir, a distributing-chamber disposed adjacent to and connected therewith and having a discharge-opening in its upper side, an atomizer disposed within said chamber and adapted to discharge the contents of the latter in the form of spray upwardly through the opening in the top of the casing, and means for supplying an air-blast to said atomizer, said means including a vertically-movable plunger adapted to be actuated by a downward pressure of the hand of the operator, whereby the fingers of the hand employed to exert such downward pressure, will receive the upward discharge of spray from the atomizer.

11. In a device of the character described, the combination with a suitable casing having a discharge-opening, of an atomizer partly submerged within said casing and adapted to discharge the contents thereof in the form of spray through the opening therein, and an air-forcing plunger adapted to be actuated by pressure exerted in a direction opposite to the direction of discharge of spray from the atomizer.

12. In a device of the character described, an inclosed case or reservoir, a supplemental chamber communicating with said reservoir and receiving liquid therefrom, an inclosed air-chamber within said reservoir, an atomizer within said supplemental chamber and communicating with said air-chamber, a plunger operating in said air-chamber and adapted to actuate said atomizer, and a valve opening into said chamber beneath said piston, substantially as shown and described.

13. In a device of the character described, an inclosed casing or reservoir, a supplemental chamber communicating with said reservoir and receiving liquid therefrom, an inclosed air-chamber within said reservoir, an atomizer within said supplemental chamber and communicating with said air-chamber, a plunger operating in said air-chamber and adapted to actuate said atomizer, and having an aperture therein, an inclosed air-chamber within said reservoir, an air-tube extending from said air-chamber into said supplemental chamber, and having an aperture in alinement with the aperture in said supplemental chamber, a collar revolubly engaging said air-tube, and having two or more apertures graduated as to size and adapted to successively register with said aperture in said air-tube, and spray-tubes disposed upon said collar and each with its discharge end contiguous to one of said graduated apertures, and means for adjusting said collar, whereby sprays of graduated fineness may be projected through said aperture in said supplemental chamber, substantially as shown and described.

14. In a device of the character described, an inclosed reservoir for the liquid, a supplemental chamber disposed to receive liquid from the reservoir and communicating with said reservoir, an atomizer within said chamber, an air-chamber, connecting means between the air-chamber and the atomizer, and a tube connecting said supplemental chamber at the water-level therein with the upper part of said reservoir above the water-level, whereby the pressure is equalized, substantially as shown and described.

15. In a device of the character described, an inclosed casing for the liquid, an air-chamber, a tube communicating with said air-chamber near the water-level and having an aperture therein, means for causing air to be forced from said air-chamber through said tube and its aperture, a collar upon said tube and having two or more apertures of graduated size adapted to register successively with the aperture in said air-tube, spray-tubes upon said collar each with its discharge end contiguous to one of said graduated apertures, and means for revolubly adjusting said collar, whereby sprays of graduated fineness may be projected, substantially as shown and described.

16. In a device of the character described, an inclosed casing for the liquid, a supplemental chamber communicating with said liquid-casing and having an aperture therein, an air-chamber within said casing, a tube leading from said air-chamber near the water-line and having an aperture in alinement with the aperture in said supplemental chamber, a collar revolubly disposed upon said tube and having two or more graduated apertures adapted to register successively with the aperture in said air-tube, spray-tubes engaging said collar and with the discharge end of each contiguous to one of said graduated apertures, means for forcing air from said air-chamber and means for revolving said collar, whereby sprays of graduated fineness may be ejected, substantially as shown and described.

In testimony that I claim the foregoing as my own I have hereto affixed my signature in the presence of two witnesses.

RICHARD C. GLANVILLE.

Witnesses:
 ELI A. BARNES,
 W. F. MCLAUGHLIN.